US008845887B2

United States Patent
Morisue

(10) Patent No.: US 8,845,887 B2
(45) Date of Patent: Sep. 30, 2014

(54) WATER PURIFIER

(75) Inventor: Takashi Morisue, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 71 days.

(21) Appl. No.: 13/575,961

(22) PCT Filed: Feb. 28, 2011

(86) PCT No.: PCT/JP2011/054447
§ 371 (c)(1),
(2), (4) Date: Jul. 30, 2012

(87) PCT Pub. No.: WO2011/118336
PCT Pub. Date: Sep. 29, 2011

(65) Prior Publication Data
US 2012/0298567 A1 Nov. 29, 2012

(30) Foreign Application Priority Data

Mar. 25, 2010 (JP) .................................. 2010-069871

(51) Int. Cl.
*B01D 35/00* (2006.01)
*G01F 1/00* (2006.01)
*B01D 21/30* (2006.01)
*C02F 1/00* (2006.01)

(52) U.S. Cl.
CPC ............. *C02F 1/008* (2013.01); *C02F 2209/44* (2013.01); *C02F 2209/40* (2013.01); *C02F 2209/006* (2013.01); *C02F 1/001* (2013.01)
USPC ............... 210/87; 210/138; 210/85; 210/143; 700/282; 702/45; 222/638

(58) Field of Classification Search
None
See application file for complete search history.

(56) References Cited

U.S. PATENT DOCUMENTS

| 3,954,621 | A | * | 5/1976 | Etani et al. ..................... 210/314 |
| 4,216,659 | A | * | 8/1980 | French ............................ 62/186 |
| 4,998,228 | A | * | 3/1991 | Eger et al. ....................... 368/10 |
| 5,658,457 | A | * | 8/1997 | Schoenmeyr ................... 210/97 |
| 2007/0050157 | A1 | * | 3/2007 | Kahn et al. ...................... 702/55 |

FOREIGN PATENT DOCUMENTS

| JP | 6-165980 A | 6/1994 |
| JP | 6-72689 U | 10/1994 |
| JP | 6-285457 A | 10/1994 |
| JP | 9-141250 A | 6/1997 |
| JP | 11-169844 A | 6/1999 |

(Continued)

*Primary Examiner* — Nam Nguyen
*Assistant Examiner* — Richard Gurtowski
(74) *Attorney, Agent, or Firm* — Birch, Stewart, Kolasch & Birch, LLP

(57) ABSTRACT

A water purifier determining an appropriate discarded water quantity includes: a purified water supply; an integrated flow quantity measuring part; and a control and calculation part. The control and calculation part is configured to determine whether purified water is unsuitable for use based upon the integrated flow quantity measured for a period of time from when the supply is started. A value of water quantity $Q_{ti}$ at the Nth time is determined based on a length of time from when the purified water supply stops the supply at the (N−1)th time up to when the purified water supply starts the supply at the Nth time; and a difference between a quantity of water measured for a period of time from when the supply at the (N−1)th time is started to when the supply at the (N−1)th time is stopped and a value of $Q_{ti}$ at the (N−1)th time.

10 Claims, 8 Drawing Sheets

(56) References Cited

FOREIGN PATENT DOCUMENTS

| JP | 2002-263638 A | 9/2002 |
|----|---------------|--------|
| JP | 2006-15232 A  | 1/2006 |
| JP | 2006-142244 A | 6/2006 |
| JP | 2007-217916 A | 8/2007 |
| JP | 2008-110327 A | 5/2008 |

* cited by examiner

US 8,845,887 B2

WATER PURIFIER

TECHNICAL FIELD

The present invention relates to a water purifier.

BACKGROUND ART

Conventionally, there has been a water purifier which purifies raw water such as tap water and well water and supplies purified water. In a general water purifier such as a household faucet-direct-coupled water purifier, after supplying purified water, water remains stagnant in a filtering medium (water purification cartridge) and a water passage inside the water purifier. When the water is left stagnant inside the water purifier for a long time, bacteria propagate inside the water purifier, thereby causing insanitation.

In particular, in a water purifier in which a part of a filtering medium or the whole of the filtering medium is composed of activated carbon, bacteria easily propagate in stagnant water inside a water passage on a secondary side on which the water has passed through the filtering medium, that is, a side downstream of the filtering medium. This is because a chloride component in raw water is removed by the activated carbon in the filtering medium.

Therefore, as a point of caution for use of the water purifier, a water purifier manufacturer encourages a user to perform the so-called water discarding that is a process in which purified water to be first used after resuming the use of the water purifier, such as purified water first supplied from the water purifier every day and purified water first supplied from the water purifier when the water purifier has not been used for some days and the use of the water purifier is resumed, is discharged for a predetermined period of time and discarded.

However, whether the water discarding is performed in reality when the use of the purified water is started after resuming the use of the water purifier, how long the water discarding is performed, and what quantity of water is discarded are left to the judgment of a user of the water purifier. Therefore, in a case where the user forgets to perform the water discarding and the water discarding is not sufficiently performed, a health hazard may be posed to the user.

Therefore, in order to allow a user to perform appropriately perform the water discarding, a water purifier having a function of notifying a user of a period of time required to perform the water discarding and a water purifier which automatically performs the water discarding have been proposed.

For example, Japanese Patent Application Laid-Open Publication No. 9-141250 (Patent Literature 1) discloses a water purification apparatus which issues an alarm to perform the water discarding and cleaning for a period of time enough to discard water which has remained stagnant inside the water purification apparatus when a state in which water is not passing continues for a predetermined period of time or more. It is described that in this water purification apparatus, cleaning time may be changed in accordance with a length of time during which the water is not passing. In addition, it is described that based on a detection signal detected by a flow sensor during the execution of the water discarding, water discarding time may be adjusted.

In a water purifier disclosed by Japanese Patent Application Laid-Open Publication No. 11-169844 (Patent Literature 2), when the water purifier is not used for a given period of time, an orange-colored LED is being lit up until discharging the water remaining inside the water purifier is finished, and thereafter, a green LED is lit up, thereby notifying a user of whether or not the purified water can be used.

In addition, in water purification apparatuses disclosed by Japanese Patent Application Laid-Open Publication No. 2006-15232 (Patent Literature 3) and Japanese Patent Application Laid-Open Publication No. 2006-142244 (Patent Literature 4), a shutting-off condition of a water shutoff valve is detected and a period of time is calculated and displayed as the number of days during which water has remained stagnant. When the number of days during which the water has remained stagnant comes to be greater than or equal to a predetermined water-remaining period of time and a user discards the remaining water from a water pipe, information on a backward counter, which is used as an indication of a quantity of the discarded water, is displayed and concurrently, a indication light is displayed so as to blink on and off.

In a water purification apparatus disclosed by Japanese Patent Application Laid-Open Publication No. 2002-263638 (Patent Literature 5), when a time interval from when a water tap for flowing tap water into an activated carbon tank is opened up to when the water tap is next opened, which is greater than or equal to a given period of time, has passed, sterilization and cleaning are performed by flowing the tap water from a secondary side of the activated carbon tank to the water tap for a predetermined set period of time.

In a water purification system disclosed by Japanese Patent Application Laid-Open Publication No. 2007-217916 (Patent Literature 6), when a period of time during which purified tap water has remained stagnant exceeds a predetermined set period of time, a water discarding solenoid valve is opened and a process to discard the remaining water is performed. When a predetermined period of time during which the water discarding solenoid valve remains open has passed, the water discarding solenoid valve is closed.

As described above, in each of these water purification apparatuses, water purifier, and water purification system, when the period of time during which the water is not passing is longer than the predetermined period of time, the notification is made so as to perform the water discarding of the given quantity, or the water discarding of the given quantity is automatically performed. This is because in each of these water purification apparatuses, water purifier, and water purification system, it is mainly considered that the remaining water is discarded.

CITATION LIST

Patent Literature

Patent Literature 1: Japanese Patent Application Laid-Open Publication No. 9-141250
Patent Literature 2: Japanese Patent Application Laid-Open Publication No. 11-169844
Patent Literature 3: Japanese Patent Application Laid-Open Publication No. 2006-15232
Patent Literature 4: Japanese Patent Application Laid-Open Publication No. 2006-142244
Patent Literature 5: Japanese Patent Application Laid-Open Publication No. 2002-263638
Patent Literature 6: Japanese Patent Application Laid-Open Publication No. 2007-217916

SUMMARY OF THE INVENTION

Technical Problem

However, bacteria inside a water purifier continuously propagate over time. Therefore, there may be a case where only by discharging stagnant water remaining inside the water purifier, the bacteria inside the water purifier and bacteria adhering to an inside of a water passage cannot be sufficiently discharged.

When passing of water inside the water purifier is stopped, bacteria in not only the remaining water but also a water passage and a filtering medium may propagate. Therefore, it is preferable that water discarding is performed with not only a quantity of water required to discard the remaining water but also a quantity of water required to clean insides of the water passage and the filtering medium.

However, in the water purification apparatus disclosed by Japanese Patent Application Laid-Open Publication No. 9-141250 (Patent Literature 1), when the water discarding is once started, integration of the period of time during which the water is not passing is stopped. In addition, in this water purification apparatus, since the water discarding is performed in order to mainly discard the remaining water, after staring the water discarding, even when the water discarding is stopped midway before having discarded the required quantity of water, setting of the quantity of water used in the water discarding is not changed. Also in the water purifier disclosed by Japanese Patent Application Laid-Open Publication No. 11-169844 (Patent Literature 2), when the water tap is closed while the water discarding is being performed, the setting of the quantity of water used in the water discarding is not changed. Therefore, in each of these water purification apparatus and water purifier, there may be a case where when subjecting the purified water to the water discarding is discontinued for a long time, and thereafter, even when the remaining water can be discarded upon resuming the use of the water purifier, the water discarding of a quantity of water enough to clean the insides of the water passage and the filtering medium cannot be performed.

In addition, in each of the water purification apparatuses disclosed by Japanese Patent Application Laid-Open Publication No. 2006-15232 (Patent Literature 3) and Japanese Patent Application Laid-Open Publication No. 2006-142244 (Patent Literature 4), when the water shutoff valve is once opened, and even when a period of time during which the water shutoff valve remains open is short and the water discarding is not sufficiently performed, the stagnant water-remaining time is reset. In addition, the quantity of water used in the water discarding is measured by means of the backward counter by using the length of time which has passed from when the water shutoff valve is opened. Even when the water shutoff valve is closed while the period of time required for the water discarding is measured by means of the backward counter, the measurement of the period of time by means of the backward counter is not discontinued. Therefore, in each of these water purification apparatuses, when a user closes the water shutoff valve midway of the water discarding and again opens the water shutoff valve soon, water which should be discarded is discharged as usable purified water. In addition, when subjecting the purified water to the water discarding is discontinued over a long period of time, there may be a case where even when the remaining water can be discarded, the water discarding of a quantity of water enough to clean the insides of the water passage and the filtering medium cannot be performed.

In each of the water purification apparatus disclosed by Japanese Patent Application Laid-Open Publication No. 2002-263638 (Patent Literature 5) and the water purification system disclosed by Japanese Patent Application Laid-Open Publication No. 2007-217916 (Patent Literature 6), although when remaining of the tap water has continued for the period of time greater than or equal to the given time, the water discarding is automatically performed, a case where a user discontinues the water discarding midway is not described.

Furthermore, when the quantity of water used in the water discarding is measured by using the period of time, a quantity of water used in the water discarding is small in a case where an instantaneous flow volume is small, and a quantity of water used in the water discarding is large in a case where an instantaneous flow volume is large, thereby making it impossible to ensure the water discarding of an actually required sufficient quantity of water.

Therefore, an object of the present invention is to provide a water purifier capable of determining an appropriate discarded water quantity.

Solution to Problem

A water purifier according to the present invention includes: a purified water supply part; a purified water quantity measuring part; and a determination part. The purified water supply part generates purified water and supplies the purified water to an outside of the water purifier. The purified water supply part is configured so as to repeat starting and stopping a supply of the purified water at a plurality of times and intermittently perform supplies of the purified water. The purified water quantity measuring part measures a quantity of the purified water supplied by the purified water supply part. The determination part determines whether the purified water supplied by the purified water supply part for a period of time from when a supply of the purified water at the Nth time (N is a natural number), among the supplies of the purified water performed by the purified water supply part at the plurality of times, is started up to when the supply of the purified water at the Nth time is stopped is unusable purified water being unsuitable for use.

The determination part is configured so as to determine that the purified water supplied by the purified water supply part is the unusable purified water being unsuitable for use in a case where a quantity of the purified water measured by the purified water quantity measuring part for a period of time from when the supply of the purified water is started by the purified water supply part up to a determination time point when the determination part determines whether the purified water supplied by the purified water supply part is the unusable purified water is less than a predetermined unusable purified water quantity.

The unusable purified water quantity at the Nth time is a quantity determined based on a length of time from when the purified water supply part stops a supply of the purified water at the (N−1)th time up to when the purified water supply part starts the supply of the purified water at the Nth time and on a difference between a quantity of the purified water, measured by the purified water quantity measuring part, for a period of time from when the supply of the purified water at the (N−1)th time is started up to when the supply of the purified water at the (N−1)th time is stopped and an unusable purified water quantity at the (N−1)th time, in a case where the supply of the purified water at the (N−1)th time is stopped when the quantity of the purified water, measured by the purified water quantity measuring part, for the period of time from when the supply of the purified water at the (N−1)th time is started up to when the supply of the purified water at the (N−1)th time is stopped is smaller than the unusable purified water quantity at the (N−1)th time.

The unusable purified water is purified water which is required to be discarded when the supply of the purified water is resumed by the purified water supply part after stopping the supply of the purified water. In order to discharge the purified water remaining inside the water purifier while the supply of the purified water by the purified water supply part is stopped and flush away bacteria inside the water purifier, the unusable purified water is required to be discarded by a user without using the unusable purified water. The unusable purified water quantity is a quantity of the unusable purified water, that is, a quantity of the water which is required to be discarded.

In the case where the supply of the purified water at the (N−1)th time is stopped when the quantity of the purified water, measured by the purified water quantity measuring part for the period of time from when the supply of the purified water at the (N−1)th time is started up to when the supply of the purified water at the (N−1)th time is stopped is smaller than the unusable purified water quantity at the (N−1)th time, only some degree of a water quantity among the purified water quantity which is required to be discarded in the supply of the purified water at the (N−1)th time is discarded. In other words, in such a case, insufficient water discarding is performed at the (N−1)th time.

Therefore, in the case where the insufficient water discarding is performed at the (N−1)th time, the unusable purified water quantity at the Nth time is determined based on the length of time from when the purified water supply part stops the supply of the purified water at the (N−1)th time up to when the purified water supply part starts the supply of the purified water at the Nth time and on the difference between the quantity of the purified water measured by the purified water quantity measuring part for the period of time from when the supply of the purified water at the (N−1)th time is started up to when the supply of the purified water at the (N−1)th time is stopped and the unusable purified water quantity at the (N−1)th time, thereby allowing a quantity of water, which should be discarded at the Nth time, to be determined in consideration of the insufficient water discarding at the (N−1)th time.

For example, even in a case where the length of time from when the purified water supply part stops the supply of the purified water at the (N−1)th time up to when the purified water supply part starts the supply of the purified water at the Nth time is comparatively short, when the quantity of water discarded at the (N−1)th time is smaller than the unusable purified water quantity at the (N−1)th time, the quantity of water discarded at the Nth time can be increased. In addition, for example, in a case where the length of time from when the purified water supply part stops the supply of the purified water at the (N−1)th time up to when the purified water supply part starts the supply of the purified water at the Nth time is comparatively long, even when some degree of a quantity of the purified water is discarded at the (N−1)th time, a quantity of the water which should be discarded at the Nth time can be increased, and thus, in a sufficient manner, the purified water remaining inside the water purifier can be discharged and bacteria inside the water purifier can be flushed away.

Hence, the water purifier capable of determining an appropriate discarded water quantity can be provided.

It is preferable that the water purifier according to the present invention includes a notification part notifying a user of information pertinent to the purified water supplied by the purified water supply part.

Hence, it is facilitated that a user performs the water discarding of an appropriate water quantity in an ensured manner.

It is preferable that in the water purifier according to the present invention, the notification part is configured so as to notify that the purified water supplied by the purified water supply part at the determination time point is unsuitable for use in the case where the quantity of the purified water, measured by the purified water quantity measuring part, for the period of time from when the supply of the purified water at the Nth time is started by the purified water supply part up to the determination time point is less than an unusable purified water quantity at the Nth time.

Hence, it can be prevented that a user uses the unusable purified water by mistake.

It is preferable that in the water purifier according to the present invention, the notification part is configured so as to notify that the purified water supplied at the determination time point is suitable for use in a case where the quantity of the purified water, measured by the purified water quantity measuring part, for the period of time from when the supply of the purified water at the Nth time is started by the purified water supply part up to the determination time point is greater than or equal to the unusable purified water quantity at the Nth time.

Hence, it is made possible that a user uses the purified water at ease.

It is preferable that in the water purifier according to the present invention, the notification part is configured so as to notify that the quantity of the purified water supplied for the period of time from when the supply of the purified water at the Nth time is started by the purified water supply part up to the determination time point is less than the unusable purified water quantity ($Q_n$) at the Nth time in a case where the supply of the purified water by the purified water supply part is stopped when the quantity of the purified water, measured by the purified water quantity measuring part, for the period of time from when the supply of the purified water is started by the purified water supply part at the Nth time up to the determination time point is less than the unusable purified water quantity at the Nth time.

Hence, it is made possible that by notifying that the water discarding is not sufficiently performed for the period of time from when the supply of the purified water at the Nth time is started up to when the supply of the purified water at the Nth time is stopped, a user is encouraged to call attention and to recognize that the water discarding is required.

It is preferable that in the water purifier according to the present invention, the notification part is configured so as to notify a difference between the quantity of the purified water supplied for the period of time from when the supply of the purified water at the Nth time is started by the purified water supply part up to the determination time point and the unusable purified water quantity at the Nth time in a case where the quantity of the purified water, measured by the purified water quantity measuring part, for the period of time from when the supply of the purified water at the Nth time is started by the purified water supply part up to the determination time point is less than or equal to the unusable purified water quantity at the Nth time.

Hence, it is made possible to allow a user to recognize the remaining quantity of water required to be discarded.

It is preferable that in the water purifier according to the present invention, the notification part is configured so as to notify a remaining period of time required when the purified water supply part supplies the unusable purified water quantity of the purified water at the Nth time, in a case where the quantity of the purified water, measured by the purified water quantity measuring part for the period of time from when the supply of the purified water at the Nth time is started by the purified water supply part up to when the supply of the purified water at the Nth time is stopped by the purified water supply part is less than or equal to the unusable purified water quantity at the Nth time, based on the difference between the unusable purified water quantity at the Nth time and the quantity of the purified water, measured by the purified water quantity measuring part, for the period of time from when the supply of the purified water at the Nth time is started up to the determination time point; the period of time during which the purified water is being supplied by the purified water supply part for the period of time from when the supply of the purified water at the Nth time is started up to when the supply of the purified water at the Nth time is stopped by the purified water supply part; and the quantity of the purified water, measured by the purified water quantity measuring part, for the period of time from when the supply of the purified water at the Nth time is started up to when the supply of the purified water at the Nth time is stopped by the purified water supply part.

Hence, it is made possible to allow a user to recognize the remaining period of time required for the water discarding, that is, a period of time up to when usable purified water is supplied.

It is preferable that in the water purifier according to the present invention, the purified water supply part includes: a first purified water port; and a second purified water port. It is preferable that the water purifier according to the present invention is configured such that the purified water supply part supplies the purified water from the first purified water port in the case where the quantity of the purified water, measured by the purified water quantity measuring part, for the period of time from when the supply of the purified water at the Nth time is started by the purified water supply part up to when the supply of the purified water at the Nth time is stopped by the purified water supply part is less than the unusable purified water quantity at the Nth time; and the purified water supply part supplies the purified water from the second purified water port in the case where the quantity of the purified water, measured by the purified water quantity measuring part, for the period of time from when the supply of the purified water at the Nth time is started by the purified water supply part up to when the supply of the purified water at the Nth time is stopped by the purified water supply part is greater than or equal to the unusable purified water quantity at the Nth time.

Hence, since the purified water supplied from the first purified water port is the purified water unsuitable for use such as drinking and the purified water supplied from the second purified water port is the purified water suitable for use such as drinking, danger that a user uses the discarded water as drinking water by mistake can be reduced.

It is preferable that the water purifier according to the present invention includes a water storage container being connected to the first purified water port, and on an upper part of the water storage container, a drainage port is formed.

Hence, the unusable purified water is stored in the water storage tank and can be used for use applications other than the use application as the purified water, for example, watering for plants and car washing. Furthermore, on the upper part of the water storage tank, the drainage port is formed, thereby allowing accidents such as overspill of water from the water storage tank to be prevented.

Advantageous Effects of the Invention

As described above, according to the present invention, a water purifier capable of determining an appropriate discarded water quantity can be provided.

DESCRIPTION OF EMBODIMENTS

Hereinafter, embodiments of the present invention will be described with reference to the accompanying drawings.

First Embodiment

Figure 1:
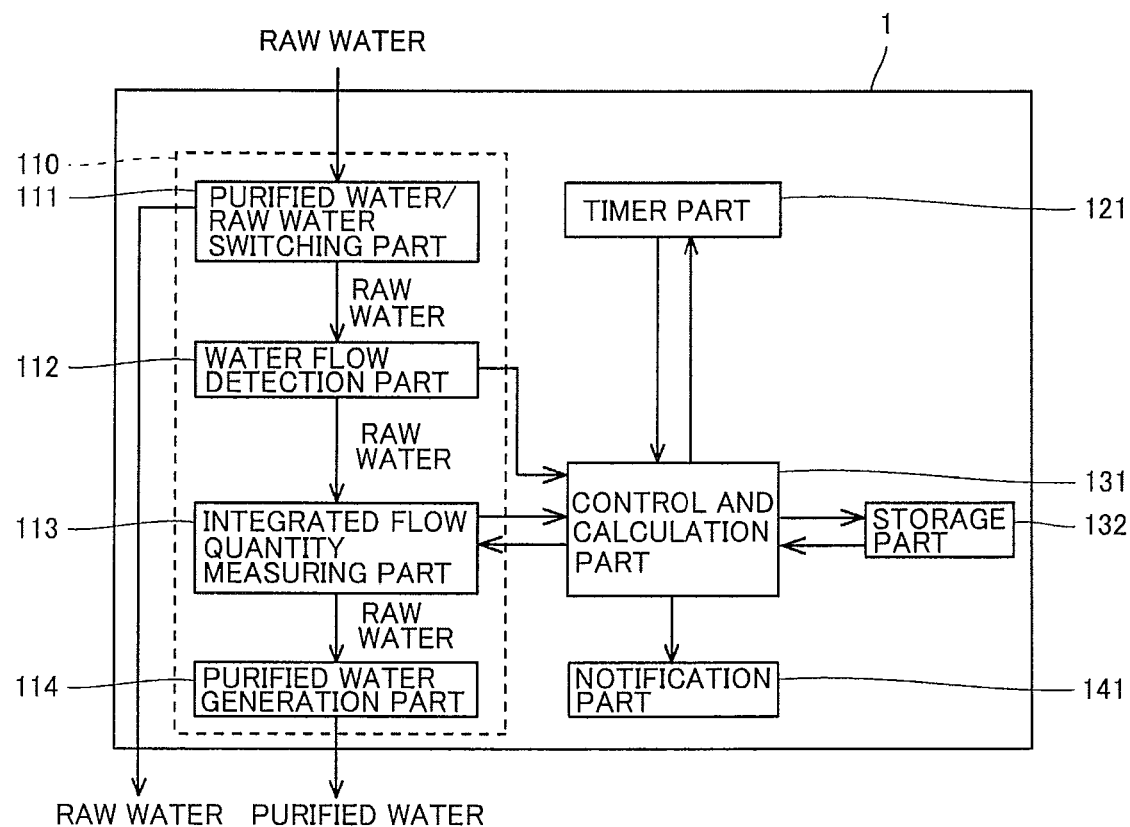
FIG. 1 is a diagram schematically illustrating a configuration of a water purifier according to a first embodiment of the present invention.

As shown in FIG. 1, a water purifier 1 according to a first embodiment includes: a purified water supply part 110; a timer part (timer) 121; a control and calculation part 131 as a determination part; a storage part (memory) 132; and a notification part 141. The purified water supply part 110 is to take in raw water such as tap water and well water from an outside of the water purifier 1, generate purified water, and supply the purified water to the outside of the water purifier 1. The purified water supply part 110 is constituted by having arranged therein a purified water/raw water switching part 111, a water flow detection part 112, an integrated flow quantity measuring part 113, and a purified water generation part 114 inside an water passage thereof. In the purified water supply part 110, the purified water/raw water switching part 111, the water flow detection part 112, the integrated flow quantity measuring part 113, and the purified water generation part 114 are arranged such that the raw water taken into the purified water supply part 110 flows through the purified water/raw water switching part 111, the water flow detection part 112, the integrated flow quantity measuring part 113, and the purified water generation part 114 in this order. The integrated flow quantity measuring part 113 is one example of a purified water quantity measuring part.

The purified water/raw water switching part 111 is to allow a user of the water purifier 1 to select whether purified water or raw water is supplied from the water purifier 1 by operating a switching lever (not shown) or the like. In this embodiment, a case where it is selected that the water purifier 1 supplies the purified water is defined as a "purified water mode" and a case where it is selected that the water purifier 1 supplies the raw water is defined as a "raw water mode".

The water flow detection part 112 is located on a downstream side of the purified water/raw water switching part 111 in the purified water supply part 110. When the water flow detection part 112 detects that water is flowing in a case where the "purified water mode" is set, the water flow detection part 112 transmits a water flow detection signal to the control and calculation part 131.

The integrated flow quantity measuring part 113, which a flow meter or the like constitutes, is located on a downstream side of the water flow detection part 112. The integrated flow quantity measuring part 113 measures an integrated flow quantity of the water flowing inside the water passage of the water purifier 1 and transmits the measured value (integrated flow quantity value) to the control and calculation part 131. When the integrated flow quantity measuring part 113 receives a reset signal transmitted from the control and calculation part 131, the integrated flow quantity measuring part 113 resets the integrated flow quantity value to 0 and starts to measure an integrated flow quantity. The integrated flow quantity value measured by the integrated flow quantity measuring part 113 is an integrated flow quantity of water flowing on an upstream side of the purified water generation part 114.

The purified water generation part 114, which a water purification filter or the like constitutes, is located on a downstream side of the integrated flow quantity measuring part 113. The purified water generation part 114 purifies the raw water by means of a filtering medium (water purification filter) or the like to be the purified water. All of the raw water measured by the integrated flow quantity measuring part 113 passes through the purified water generation part 114 and is caused to be the purified water, and therefore, the integrated flow quantity measuring part 113 measures a quantity of the purified water supplied by the purified water supply part 110.

The timer part 121 measures a period of time. The timer part 121 performs transmission and reception of a signal to and from the control and calculation part 131. When the timer part 121 receives a reset signal transmitted from the control and calculation part 131, the timer part 121 resets the measured period of time to 0 and starts to measure a period of time from 0.

The control and calculation part 131 is constituted of a microcomputer. The control and calculation part 131 controls the integrated flow quantity measuring part 113, the timer part 121, and the notification part 141 and performs a variety of calculations. The control and calculation part 131 receives a water flow detection signal from the water flow detection part 112. The control and calculation part 131 performs the transmission and reception of the signal to and from the integrated flow quantity measuring part 113 as described above. The control and calculation part 131 also performs transmission and reception of signals to and from the timer part 121 and the storage part 132. The control and calculation part 131 transmits a control signal to the notification part 141 and controls the notification part 141.

The storage part 132 has programs and parameters stored therein. The storage part 132 transmits the programs and parameters stored therein to the control and calculation part 131. In addition, depending on circumstances, the storage part 132 performs transmission and reception of temporary data to and from the control and calculation part 131.

The notification part 141 notifies a user of the water purifier 1 of information pertinent to the purified water and the water purifier 1. The notification part 141 includes any notification means, for example, such as a loudspeaker, a display, and a lamp and is capable of performing notification by employing a method using audio, a display with characters or video, emission of light of particular colors, or the like. The notification part 141 may perform the notification by using means other than the audio or the display with characters or video.

Operations performed when the water purifier 1 configured as described above supplies the purified water will be described.

When a user operates the switching lever (not shown) or the like of the water purifier 1 and selects the "purified water mode" and a water tap (not shown) is opened, raw water such as tap water and well water flows inside the water passage of the purified water supply part 110. The raw water passes through the purified water/raw water switching part 111, the water flow detection part 112, and the integrated flow quantity measuring part 113 in this order and flows into the purified water generation part 114. The purified water generation part 114 is constituted of the filtering medium, and the water passing through the purified water generation part 114 is purified. The water having passed through the purified water generation part 114 is supplied to an outside of the water purifier 1 as the purified water. In such a manner, when the "purified water mode" is selected and the water tap is opened, the supply of the purified water, performed by the purified water supply part 110, is started.

In a case where a user selects the "raw water mode", even when the water tap is opened and the raw water is supplied to an inside of the water purifier 1, the raw water does not pass through the purified water generation part 114 of the purified water supply part 110 and is directly discharged to the outside of the water purifier 1.

The water tap is closed or the purified water/raw water switching part 111 is operated and the switching from the "purified water mode" to the "raw water mode" is performed, thereby stopping the supply of the purified water performed by the purified water supply part 110. After the supply of the purified water, performed by the purified water supply part 110, has been stopped, when the water tap is opened again and the "purified water mode" is selected, the supply of the purified water, performed by the purified water supply part 110, is resumed.

As described above, the purified water supply part 110 is configured so as to repeat the starting and stopping of the supply of the purified water at a plurality of times and intermittently performs the supplies of the purified water.

An unusable purified water quantity $Q_{ti}$ upon starting the supply of the purified water at the Nth time (N is a natural number) among the plurality of times at which the supply of the purified water is performed by the purified water supply part 110 of the water purifier 1 will be described.

A quantity of the purified water which is required to be discarded upon staring the supply of the purified water performed at the Nth time, that is, the unusable purified water quantity $Q_{ti}$ at the Nth time is determined based on a length of time from when the purified water supply part 110 stops the supply of the purified water at the (N−1)th time up to when the purified water supply part 110 starts the supply of the purified water at the Nth time.

In particular, in a case where the supply of the purified water at the (N−1)th time is stopped when a quantity of the purified water, measured by the integrated flow quantity measuring part 113, for a period of time from when the supply of the purified water at the (N−1)th time is started up to when the supply of the purified water at the (N−1)th time is stopped is smaller than an unusable purified water quantity $Q_{pti}$ at the (N−1)th time, the unusable purified water quantity $Q_{ti}$ at the Nth time is a quantity determined based on a length of time from when the purified water supply part 110 stops the supply of the purified water at the (N−1)th time up to when the purified water supply part 110 starts the supply of the purified water at the Nth time and on a difference between a quantity of the purified water, measured by the integrated flow quantity measuring part 113, for a period of time from when the supply of the purified water at the (N−1)th time is started up to when the supply of the purified water at the (N−1)th time is stopped and the unusable purified water quantity $Q_{pti}$ at the (N−1)th time.

In this embodiment, the unusable purified water quantity $Q_{ti}$ at the Nth time is obtained, for example, as described below.

First, from the unusable purified water quantity $Q_{pti}$, measured from when the supply of the purified water at the (N−1)th time is started up to when the supply of the purified water at the (N−1)th time is stopped, that is, the unusable purified water quantity $Q_{pti}$ at the (N−1)th time and a purified water supply quantity $Q_{pmf}$ for the period of time from when the supply of the purified water at the (N−1)th time is started up to when the supply of the purified water at the (N−1)th time is stopped, an unusable purified water remaining quantity $Q_{pri}$ at the (N−1)th time is calculated by using the following (Equation 1).

$$Q_{pri}=\max(Q_{pti}-Q_{pmf},0) \qquad \text{(Equation 1)}$$

Here, the max (A, B) indicate maximum values of A and B.

Next, a purified water supply stop time (hereinafter, referred to as a purified water supply stop remaining time $T_{rs}$ at the Nth time), corresponding to the unusable purified water remaining quantity $Q_{pri}$ at the (N−1)th time, is calculated by using the following (Equation 2).

$$T_{rs}=F_1(Q_{pri}) \qquad \text{(Equation 2)}$$

Here, $F_1(x)$ is a monotonically increasing function passing through (0, 0) and ($Q_{pti}$, $T_{pts}$) in a domain $0 \le x \le Q_{pti}$ and in a range $0 \le F_1(x) \le T_{pts}$. Here, $T_{pts}$ is a purified water supply stop remaining time $T_{rs}$ at the Nth time when the unusable purified water remaining quantity $Q_{pri}$ at the (N−1)th time is equal to the unusable purified water quantity $Q_{pti}$ at the (N−1)th time, that is, a purified water supply stop remaining time (hereinafter, referred to as a purified water supply stop total time $T_{pts}$ at the (N−1)th time) measured when a purified water supply quantity $Q_{pmf}$ for the period of time from when the supply of purified water at the (N−1)th time is started up to when the supply of purified water at the (N−1)th time is stopped is deemed as 0.

Figure 2:
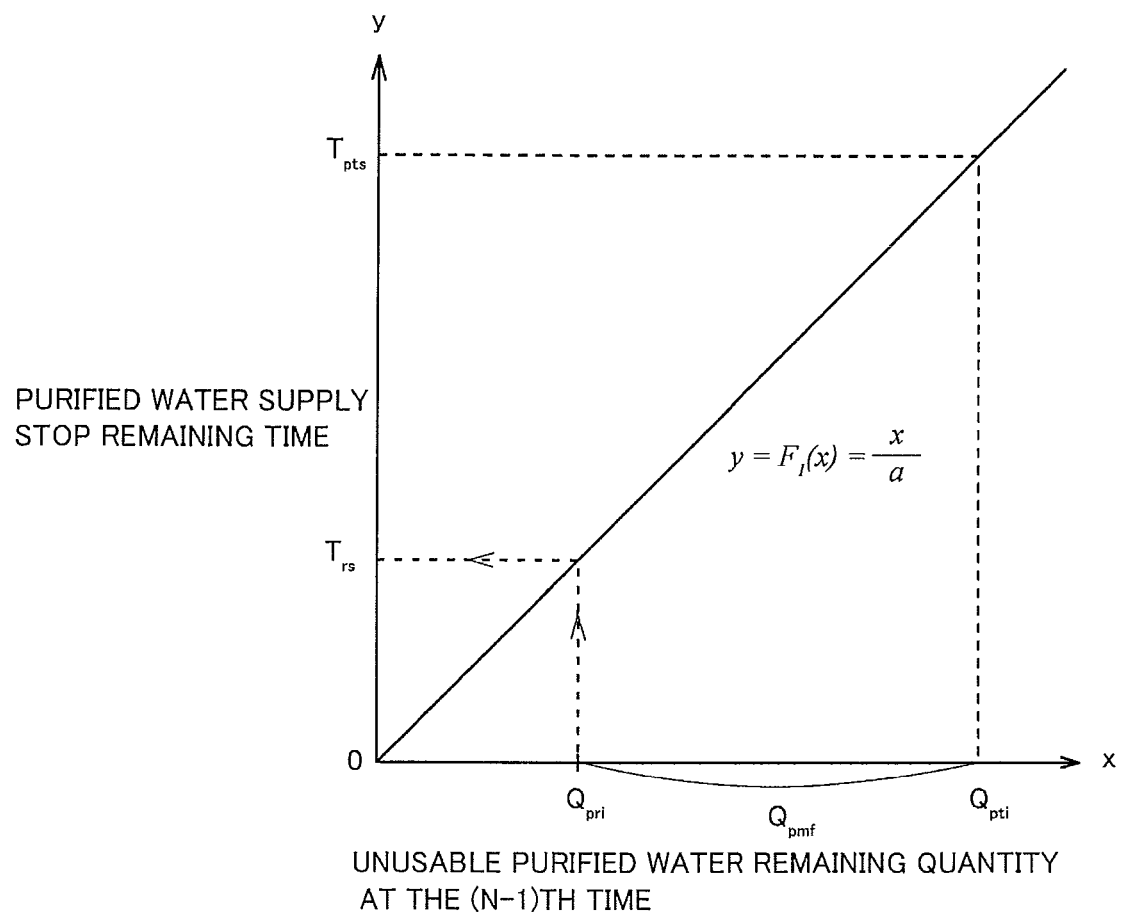
FIG. 2 shows one example of a relationship of an unusable purified water supply remaining quantity at the (N−1)th time and a purified water supply stop remaining time.

As shown in FIG. 2, for example, $T_{rs}$ will be described as a linear function of $Q_{pri}$. When a purified water supply quantity $Q_{pmf}$ at the (N−1)th time is less than an unusable purified water quantity $Q_{pti}$ at the (N−1)th time, water discarding at the (N−1)th time is insufficient. As described above, when the water discarding at the (N−1)th time is insufficient, an unusable purified water remaining quantity $Q_{pri}$ at the (N−1)th time is a quantity larger than 0. When a purified water supply quantity $Q_{pmf}$ at the (N−1)th time approximates to 0, it results that the water discarding has been hardly performed in the supply of the purified water at the (N−1)th time. In this case, an unusable purified water remaining quantity $Q_{pri}$ at the (N−1)th time is nearly the same quantity as an unusable purified water quantity $Q_{pti}$ at the (N−1)th time. When the purified water supply quantity $Q_{pmf}$ at the (N−1)th time is large, the unusable purified water remaining quantity $Q_{pri}$ at the (N−1)th time becomes small. When the purified water supply quantity $Q_{pmf}$ at the (N−1)th time is greater than or equal to an unusable purified water quantity $Q_{pti}$ at the (N−1)th time, the water discarding has been sufficiently performed in the supply of the purified water at the (N−1)th time. At this time, the unusable purified water remaining quantity $Q_{pri}$ at the (N−1)th time is 0 by (Equation 1).

As shown in FIG. 2, based on (Equation 2), a remaining time required to supply the purified water of an unusable purified water remaining quantity $Q_{pri}$ at the (N−1)th time, that is, a purified water supply stop remaining time $T_{rs}$ at the the Nth time can be obtained.

Next, from a purified water supply stop remaining time $T_{rs}$ at the Nth time and the period of time from when the supply of the purified water at the (N−1)th time is stopped up to when the supply of the purified water at the Nth time is started (hereinafter, referred to as a purified water supply stop real time $T_{as}$), as in (Equation 3), a purified water supply stop total time $T_{ts}$ at the Nth time is obtained.

$$T_{ts}=T_{as}+T_{rs} \qquad \text{(Equation 3)}$$

Lastly, based on (Equation 4), an unusable purified water quantity $Q_{ti}$ at the Nth time is obtained.

$$Q_{ti}=F_2(T_{ts}) \qquad \text{(Equation 4)}$$

Here, $F_2(x)$ is a monotonically increasing function passing through (0, 0) in a domain $0 \le x$ and in a range $0 \le F_2(x)$.

Figure 3:
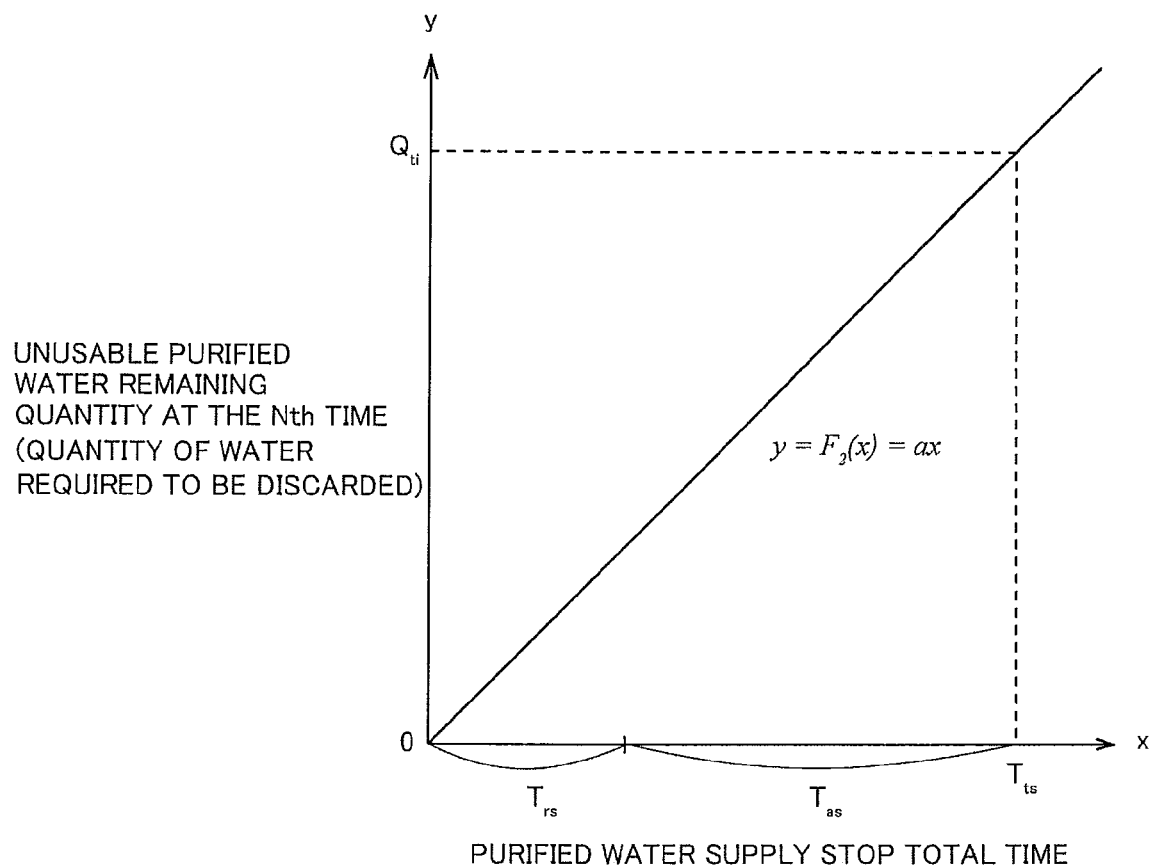
FIG. 3 shows one example of a relationship of a purified water supply stop total time and an unusable purified water quantity at the Nth time.

As shown in FIG. 3, for example, $Q_{ti}$ will be described as a linear function of $T_{ts}$. The longer a purified water supply stop total time $T_{ts}$ at the Nth time is, the larger an unusable purified water quantity $Q_{ti}$ at the Nth time is. When a purified water supply stop total time $T_{ts}$ is short and approximates nearly to, for example, 0, an unusable purified water quantity $Q_{ti}$ at the Nth time also becomes a value approximating nearly to 0. In such a case, it is hardly required to perform the water discarding. The longer a purified water supply stop total time $T_{ts}$ at the Nth time is, the more the water discarding is required. Therefore, it is required to notify a user that the longer a purified water supply stop total time $T_{ts}$ at the Nth time is, the more the water discarding is required.

As shown in FIG. 3, since (Equation 4) is the monotonically increasing function passing through (0, 0), (Equation 4) can be expressed, for example, as the following (Equation 5).

$$y=F_2(x)=ax \qquad \text{(Equation 5)}$$

Here, a is a positive constant. In (Equation 5), when x increases, y linearly increases, and when x decreases, y linearly decreases.

It is preferable that a value of a is set in consideration of a structure of the water purifier 1, a quantity of water remaining inside the water purifier 1, and a material of the water passage, for example, such as easiness of adhesion of bacteria and easiness of becoming dirty. For example, when the quantity of water remaining in the water purifier 1 is large and the bacteria are easily attached to an inside of the water purifier 1, a value of a is set to be large. On the other hand, when the quantity of water remaining in the water purifier 1 is small and the bacteria are hardly attached to the inside of the water purifier 1, a value of a is set to be small.

It is preferable that (Equation 4) is not limited to the function expressed by (Equation 5) and a function which allows optimum water discarding, that is, necessary and sufficient water discarding to be performed in accordance with properties of the water purifier 1 is selected.

Here, (Equation 2) for obtaining a purified water supply stop remaining time $T_{rs}$ at the Nth time can be expressed, for example, as the following (Equation 6).

$$\begin{aligned} y &= F_1(x) \\ &= (T_{pts}/Q_{pti})/x \\ &= (F_2^{-1}(Q_{pti})/Q_{pti})x \end{aligned} \qquad \text{(Equation 6)}$$

By using (Equation 5) as a specific example of $F_2(x)$, (Equation 6) finally becomes the following (Equation 7).

$$\begin{aligned} y &= (F_2^{-1}(Q_{pti})/Q_{pti})x \\ &= ((Q_{pti}/a)/Q_{pti})x \\ &= x/a \end{aligned} \qquad \text{(Equation 7)}$$

In other words, (Equation 2) becomes an inverse function of (Equation 4).

In (Equation 7), in accordance with an increase in x($Q_{pri}$), y($T_{rs}$) increases, and in accoracne with a decrease in x($Q_{pri}$), y($T_{rs}$) decreases. In other words, the larger a purified water supply quantity $Q_{pmf}$ at the (N−1)th time is, the smaller x($Q_{pri}$) is and a purified water supply stop remaining time $T_{rs}$ linearly decreases, and when a purified water supply quantity $Q_{pmf}$ at the (N−1)th time is greater than or equal to an unusable purified water quantity $Q_{pti}$ upon supplying the purified water at the (N−1)th time (x=0), a purified water supply stop remaining time $T_{rs}$ becomes 0.

It is preferable that (Equation 2) is not limited to the function expressed by (Equation 7) and a function which allows optimum water discarding, that is, necessary and sufficient water discarding to be performed in accordance with the properties of the water purifier 1 is selected.

In addition, (Equation 2) and (Equation 4) are not required to be the functions which are mutually inverse.

In addition, in addition to the calculations of an unusable purified water quantity $Q_{ti}$ at the Nth time by using the functions, the storage part 132 may be caused to store a table representing a relationship between x and y, and referencing of y may be performed based on x, whereby a purified water supply stop remaining time $T_{rs}$ at the Nth time and an unusable purified water quantity $Q_{pti}$ at the (N−1)th time may be derived.

As described above, in this embodiment, first, based on the unusable purified water remaining quantity $Q_{pri}$ at the (N−1)th time, the purified water supply stop remaining time $T_{rs}$ at the Nth time required to supply the unusable purified water remaining quantity $Q_{pri}$ of the purified water at the (N−1)th time is obtained, and next, based on the purified water supply stop remaining time $T_{rs}$ at the Nth time and the purified water supply stop real time $T_{as}$ at the Nth time, the unusable purified water quantity $Q_{ti}$ at the Nth time is determined.

Next, a water discarding notification operation in the water purifier 1 for notifying a user whether the water discarding is required will be described. In this embodiment, a case where the supply of the purified water at the Nth time (N is a natural number) among the supplies of the purified water performed by the purified water supply part 110 at the plurality of times, is started will be described.

Figure 4:
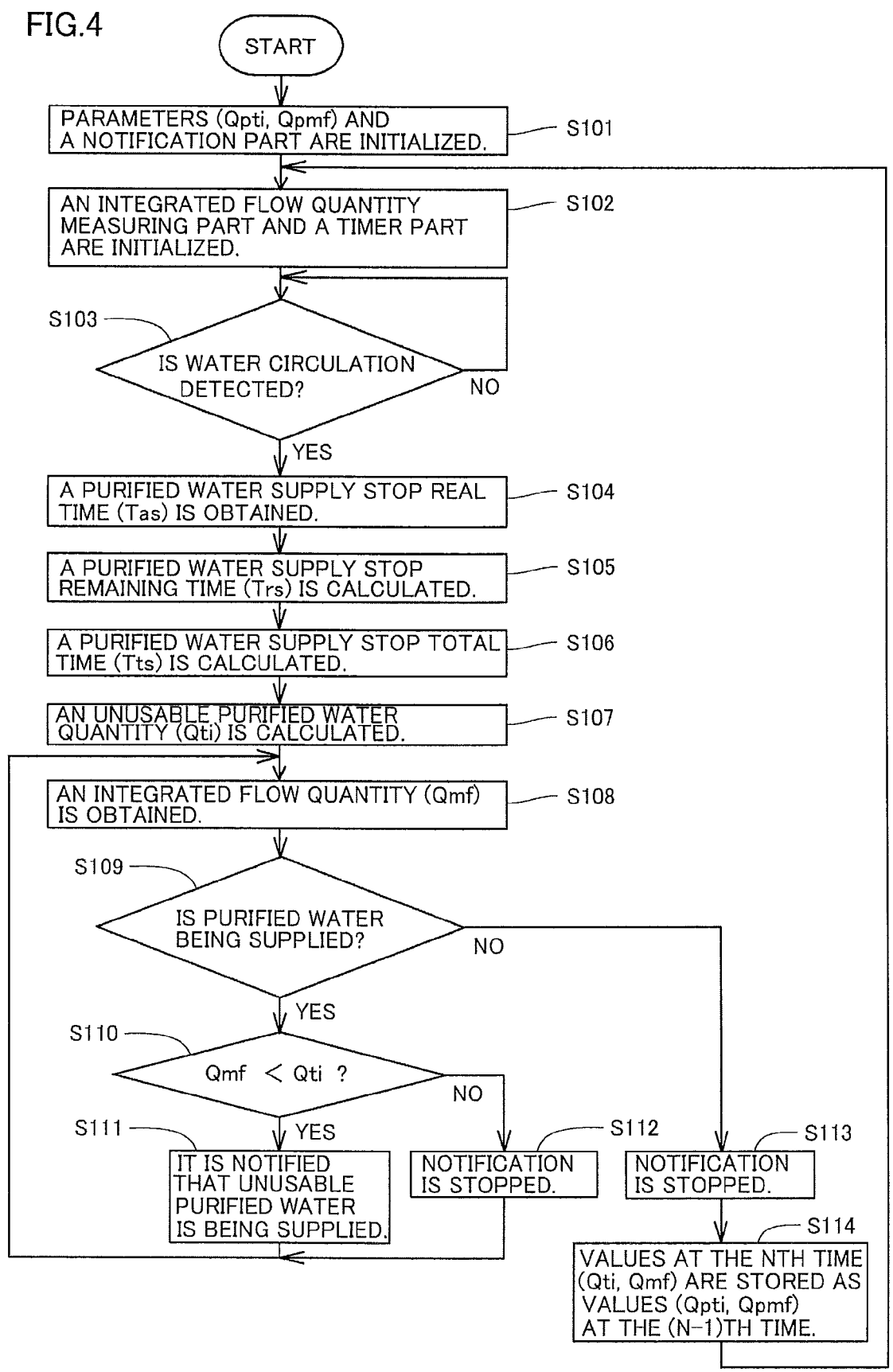
FIG. 4 is a flowchart showing control processes of a water discarding notification operation of the water purifier according to the first embodiment of the present invention in order.

As shown in FIG. 4, at step S101, when a user turns on a power source (not shown) of the water purifier 1, when the user presses a reset button (not shown) of the water purifier 1, when the user replaces a filtering medium (not shown) in a case where in the water purifier 1, the filtering medium is replaceable, and the like, the control and calculation part 131 initializes parameters. The parameters initialized at step S101 are an unusable purified water quantity $Q_{pti}$ at the (N−1)th time and a quantity of the purified water supplied from when the supply of the purified water at the (N−1)th time is started up to when the supply of the purified water at the (N−1)th time is stopped, that is, a purified water supply quantity $Q_{pmf}$ at the (N−1)th time.

When the water discarding is not required, for example, upon initially using the water purifier 1 and upon replacing the filtering medium in a case where in the water purifier 1, the filtering medium is replaceable, the parameters are initialized so as to satisfy $Q_{pti}=Q_{pmf}=0$. On the other hands, when water discarding of a predetermined quantity of water is required, the parameters are initialized so as to satisfy $Q_{pti}$=a predetermined quantity and $Q_{pmf}=0$ and stored in the storage part 132 as the parameters.

Furthermore, if necessary, the control and calculation part 131 transmits to the notification part 141 a notification signal notifying that the notification is stopped and initializes the notification part 141. When the notification part 141 receives the notification signal notifying that the notification is stopped, the notification part 141 stops the notification to the user.

At step S102, the control and calculation part 131 transmits reset signals to the integrated flow quantity measuring part 113 and the timer part 121 and initializes the integrated flow quantity measuring part 113 and the timer part 121. As initialization of the integrated flow quantity measuring part 113 and the timer part 121, the control and calculation part 131 resets an integrated flow quantity measured by the integrated flow quantity measuring part 113 and a period of time measured by the timer part 121 to 0.

At step S103, the control and calculation part 131 confirms whether water circulation is detected by the water flow detection part 112. When the water circulation is detected by the water flow detection part 112, the operation proceeds to step S104. When the water circulation is not detected by the water flow detection part 112, the operation returns to step S103.

At step S104, the control and calculation part 131 performs transmission and reception of a control signal to and from the timer part 121 and obtains from the timer part 121 a period of time measured by the timer part 121 at that time point, that is, a purified water supply stop real time $T_{as}$ at the Nth time. The purified water supply stop real time $T_{as}$ at the Nth time is a period of time during which the supply of the purified water is stopped.

At step S105, the control and calculation part 131 obtains a purified water supply stop remaining time $T_{rs}$ at the Nth time. The purified water supply stop remaining time $T_{rs}$ at the Nth time is obtained as described below.

First, from an unusable purified water quantity $Q_{pti}$ upon the supply of the purified water at the (N−1)th time and a purified water supply quantity $Q_{pmf}$ from when the supply of the purified water at the (N−1)th time is started up to when the supply of the purified water at the (N−1)th time is stopped, the control and calculation part 131 calculates an unusable purified water remaining quantity $Q_{pri}$ at the (N−1)th time by using the above-described (Equation 1).

Next, from the unusable purified water remaining quantity $Q_{pri}$ at the (N−1)th time, the control and calculation part 131 calculates a period of time (hereinafter, referred to as a purified water supply stop remaining time $T_{rs}$) required to supply the unusable purified water remaining quantity $Q_{pri}$ of the purified water at the (N−1)th time by using the above-described (Equation 2).

Upon starting an initial supply of the purified water, that is, upon staring a supply of the purified water at the first time (N=1), an unusable purified water quantity $Q_{pti}$ at the (N−1)th time is set to an initial value greater than or equal to 0, which is previously determined, and a purified water supply quantity $Q_{pmf}$ at the (N−1)th time is set to 0 as an initial value. In this embodiment, upon starting the supply of the purified water at the first time (N=1), a purified water supply stop total time $T_{pts}$ is defined by $T_{pts}=F_2^{-1}(Q_{pti})$ using the inverse function of $F_2(x)$ as described above.

At step S106, from the purified water supply stop real time $T_{as}$ obtained at step S104 and the purified water supply stop remaining time $T_{rs}$ calculated at step S105, as a period of time required to supply an unusable purified water quantity $Q_{ti}$ at the Nth time, a purified water supply stop total time $T_{ts}$ is calculated by using the above-described (Equation 3).

At step S107, from the purified water supply stop total time $T_{ts}$ obtained at step S106, an unusable purified water quantity $Q_{ti}$ at the Nth time is calculated by using the above-described (Equation 4).

In a case where the water purifier 1 is configured so as to be capable of supplying the purified water suitable for use by flowing a predetermined quantity of water even when the purified water supply stop total time $T_{ts}$ at the Nth time is large, a predetermined upper limit value may be set for the unusable purified water quantity $Q_{ti}$ at the Nth time, and when the result of (Equation 4) exceeds the predetermined upper limit value, a process (limiter process) in which the unusable purified water quantity $Q_{ti}$ at the Nth time is set to the upper limit value may be performed immediately after step S107.

At step S108, an integrated flow quantity at the present time, that is, an integrated flow quantity from when the supply of the purified water at the Nth time is started up to the present time, that is, an integrated flow quantity $Q_{mf}$ at the Nth time is obtained from the integrated flow quantity measuring part 113.

At step S109, the control and calculation part 131 determines whether the purified water is being supplied. When a water flow detection signal is received from the water flow detection part 112, the control and calculation part 131 determines that the purified water is being supplied. When the purified water is being supplied, the operation proceeds to step S110. When the purified water is not being supplied, the operation proceeds to step S113.

At step S110, the control and calculation part 131 determines whether the integrated flow quantity $Q_{mf}$ at the Nth time is less than the unusable purified water quantity $Q_{ti}$ at the Nth time. When the integrated flow quantity $Q_{mf}$ at the Nth time is less than the unusable purified water quantity $Q_{ti}$ at the Nth time, the operation proceeds to step S111. When the integrated flow quantity $Q_{mf}$ at the Nth time is not less than the unusable purified water quantity $Q_{ti}$ at the Nth time, the operation proceeds to step S112.

At step S111, the control and calculation part 131 transmits to the notification part 141 a notification signal notifying that the unusable purified water is being supplied, and the notification part 141 notifies a user that the unusable purified water is being supplied. Thereafter, the operation returns to step S108.

In a case where the purified water supply stop total time $T_{ts}$ at the Nth time is short (for example, within several hours), as a result, the unusable purified water quantity $Q_{ti}$ at the Nth time is small (for example, within several tens of milliliters, and it is less likely to pose a health hazard to the user, no notification signal notifying that the unusable purified water is being supplied may be transmitted.

At step S112, the control and calculation part 131 transmits to the notification part 141 a notification signal which stops the notification notifying that the unusable purified water is being supplied, and the notification part 141 stops the notification. Thereafter, the operation returns to step S108.

At step S113, the control and calculation part 131 transmits to the notification part 141 the notification signal which stops the notification notifying that the unusable purified water is being supplied, and the notification part 141 stops the notification. Thereafter, the operation proceeds to step S114.

At step S114, the control and calculation part 131 causes the storage part 132 to store the unusable purified water quantity $Q_{ti}$ at the Nth time as the unusable purified water quantity $Q_{pti}$ at the (N−1)th time and causes the storage part 132 to store the value of the integrated flow quantity $Q_{mf}$ at the Nth time, measured for the period of time from when the supply of the purified water at the Nth time is started up to when the supply of the purified water at the Nth time is stopped as the value of the purified water supply quantity $Q_{pmf}$ at the (N−1)th time, measured for the period of time from when the supply of the purified water at the (N−1)th time is started up to when the supply of the purified water at the (N−1)th time is stopped. Thereafter, the operation returns to step S102.

In this embodiment, while the integrated flow quantity $Q_{mf}$ measured from when the supply of the purified water at the Nth time is started is less than the unusable purified water quantity $Q_{ti}$ at the Nth time, it is notified that the purified water is unusable. However, in a case where the water purifier 1 is configured such that a purified water supply quantity per unit time is constant, the integrated flow quantity $Q_{mf}$ from when the supply of the purified water at the Nth time is started and the purified water supply time $T_{wp}$ are in a proportional relationship. Therefore, it may be notified that the purified water is unusable for a period of time which is less than a predetermined period of time corresponding to a purified water supply time $T_{wp}$ required by the purified water supply part 110 to discharge the unusable purified water quantity $Q_{ti}$ of the purified water at the Nth time.

As described above, the water purifier 1 according to the first embodiment includes: the purified water supply part 110; the integrated flow quantity measuring part 113; and the control and calculation part 131. The purified water supply part 110 generates the purified water and supplies the purified water to the outside of the water purifier 1. The purified water supply part 110 is configured so as to repeat the starting and stopping of the supply of the purified water at the plurality of times and intermittently performs the supplies of the purified water. The integrated flow quantity measuring part 113 measures a quantity of the purified water supplied by the purified water supply part 110. The control and calculation part 131 determines whether the purified water supplied by the purified water supply part 110 for the period of time from when the supply of the purified water at the Nth time (N is a natural number), among the supplies of the purified water performed by the purified water supply part 110 at the plurality of times, is started up to when the above-mentioned supply of the purified water is stopped is the unusable purified water which is unsuitable for use.

The control and calculation part 131 is configured so as to determine that the purified water supplied by the purified water supply part 110 is the unusable purified water which is unsuitable for use in a case where a quantity of the purified water measured by the integrated flow quantity measuring part 113 for the period of time from when the supply of the purified water is started by the purified water supply part 110 up to the determination time point when the control and calculation part 131 determines whether the purified water supplied by the purified water supply part 110 is the unusable purified water is less than the predetermined unusable purified water quantity $Q_{ti}$.

In the case where the supply of the purified water at the (N−1)th time is stopped when the quantity of the purified water, measured by the integrated flow quantity measuring part 113, for the period of time from when the supply of the purified water at the (N−1)th time is started up to when the supply of the purified water at the (N−1)th time is stopped is smaller than the unusable purified water quantity $Q_{ti}$ at the (N−1)th time, the unusable purified water quantity $Q_{ti}$ at the Nth time is the quantity determined based on the length of time from when the purified water supply part 110 stops the supply of the purified water at the (N−1)th time up to when the purified water supply part 110 starts the supply of the purified water at the Nth time and on the difference between the quantity of the purified water, measured by the integrated flow quantity measuring part 113, for the period of time from when the supply of the purified water at the (N−1)th time is started up to when the supply of the purified water at the (N−1)th time is stopped and the unusable purified water quantity $Q_{ti}$ at the (N−1)th time.

In the case where the supply of the purified water at the (N−1)th time is stopped when the quantity of the purified water, measured by the integrated flow quantity measuring part 113 for the period of time from when the supply of the purified water at the (N−1)th time is started up to when the supply of the purified water at the (N−1)th time is stopped is smaller than the unusable purified water quantity $Q_{ti}$ at the (N−1)th time, only some degree of a water quantity among the purified water quantity which is required to be discarded in the supply of the purified water at the (N−1)th time is discarded. In other words, in such a case, insufficient water discarding is performed at the (N−1)th time.

Therefore, in the case where the insufficient water discarding is performed at the (N−1)th time, the unusable purified water quantity $Q_{ti}$ at the Nth time is determined based on the length of time from when the purified water supply part 110 stops the supply of the purified water at the (N−1)th time up to when the purified water supply part 110 starts the supply of the purified water at the Nth time and on the difference between the quantity of the purified water measured by the integrated flow quantity measuring part 113 for the period of time from when the supply of the purified water at the (N−1)th time is started up to when the supply of the purified water at the (N−1)th time is stopped and the unusable purified water quantity $Q_{ti}$ at the (N−1)th time, thereby allowing a quantity of water, which should be discarded at the Nth time, to be determined in consideration of the insufficient water discarding at the (N−1)th time.

For example, even in a case where the length of time from when the purified water supply part 110 stops the supply of the purified water at the (N−1)th time up to when the purified water supply part 110 starts the supply of the purified water at the Nth time is comparatively short, when the quantity of water discarded at the (N−1)th time is smaller than the unusable purified water quantity at the (N−1)th time, the quantity of water discarded at the Nth time can be increased. In addition, for example, in a case where the length of time from when the purified water supply part 110 stops the supply of the purified water at the (N−1)th time up to when the purified water supply part 110 starts the supply of the purified water at the Nth time is comparatively long, even when some degree of a quantity of the purified water is discarded at the (N−1)th time, a quantity of the water, which should be discarded at the Nth time, can be increased, and thus, in a sufficient manner, the purified water remaining inside the water purifier 1 can be discharged and bacteria inside the water purifier 1 can be flushed away.

Hence, the water purifier 1 capable of determining an appropriate discarded water quantity can be provided.

In addition, the water purifier 1 according to the first embodiment includes the notification part 141 for notifying the user of the information pertinent to the purified water supplied by the purified water supply part 110.

Hence, it is facilitated that the user performs the water discarding of an appropriate water quantity in an ensured manner.

In addition, in the water purifier 1 according to the first embodiment, the notification part 141 is configured so as to notify that the purified water supplied by the purified water supply part 110 is the unusable purified water which is unsuitable for use in the case where the quantity of the purified water measured by the integrated flow quantity measuring part 113 for the period of time from when the supply of the purified water is started by the purified water supply part 110 up to the determination time point is less than the unusable purified water quantity $Q_{ti}$ at the Nth time.

Hence, it can be prevented that the user uses the unusable purified water by mistake.

Second Embodiment

A water purifier according to a second embodiment is configured so as to be similar to the water purifier 1 (FIG. 1) according to the first embodiment. In the second embodiment, a notification part 141 of the water purifier 1 is configured so as to perform not only the notification in the case where purified water supplied by a purified water supply part 110 is unusable purified water but also notification that usable purified water is being supplied in a case where the usable purified water is being supplied. Furthermore, the notification part 141 is configured such that when a water flow detection part 112 detects that the supply of the purified water is stopped while an integrated flow quantity $Q_{mf}$ measured from when the supply of the purified water at the Nth time is started by the purified water supply part 110 is less than an unusable purified water quantity $Q_{ti}$ at the Nth time, the notification part 141 notifies a user that the unusable purified water quantity $Q_{ti}$ of the purified water at the Nth time is not sufficiently discarded.

Figure 5:
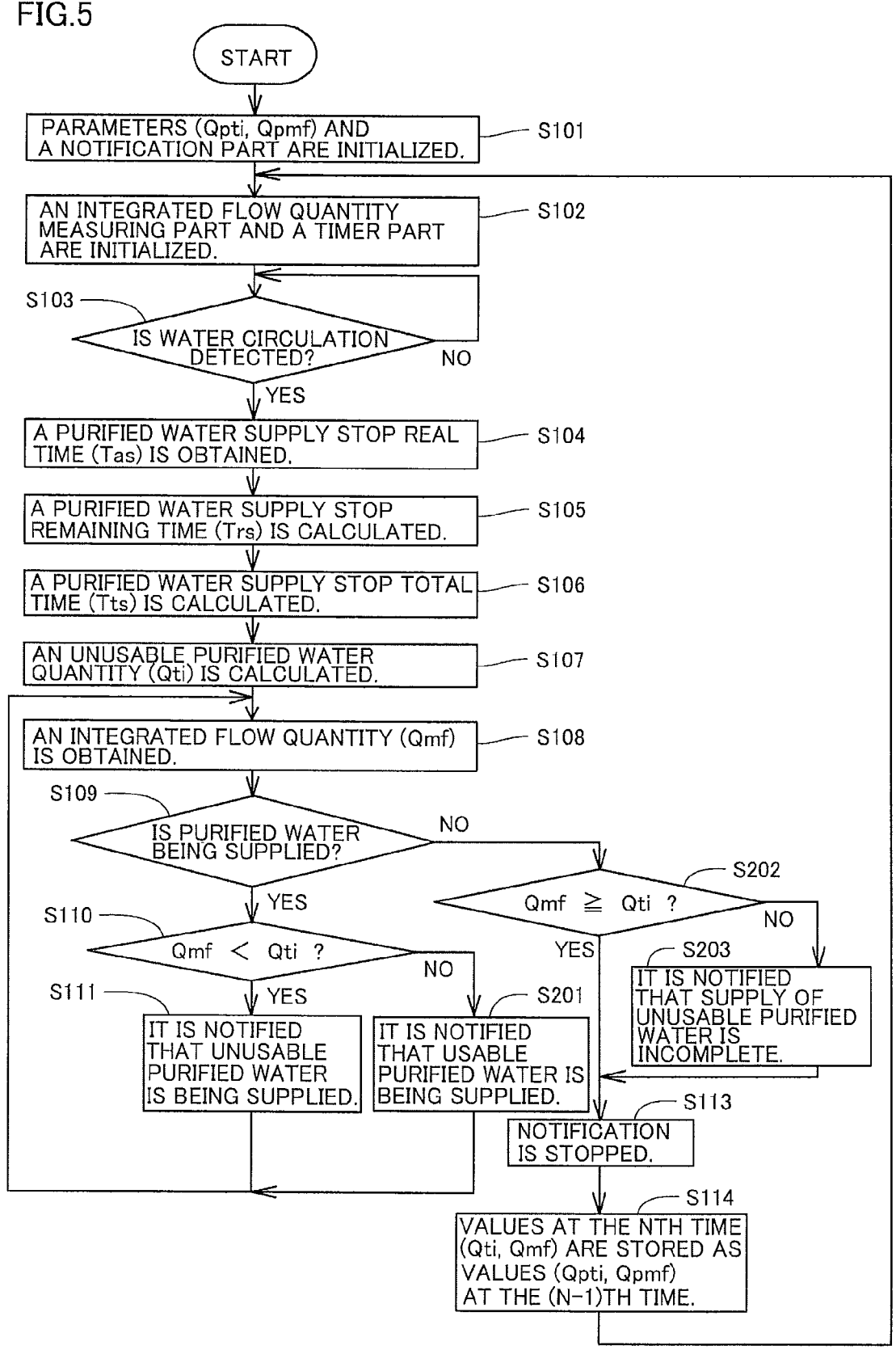
FIG. 5 is a flowchart showing control processes of a water discarding notification operation of a water purifier according to a second embodiment of the present invention in order.

As shown in FIG. 5, in the water purifier 1, as in the first embodiment, at step S109, a control and calculation part 131 determines whether the purified water is being supplied. When a water flow detection signal has been received from the water flow detection part 112, the control and calculation part 131 determines that the purified water is being supplied. When the purified water is being supplied, an operation proceeds to step S110. When the purified water is not being supplied, unlike the first embodiment, the operation proceeds to step S202.

At step S110, as in the first embodiment, the control and calculation part 131 determines whether an integrated flow quantity $Q_{mf}$, integrated from when the supply of the purified water is started, is less than an unusable purified water quantity $Q_{ti}$. When the integrated flow quantity $Q_{mf}$, integrated from when the supply of the purified water is started, is less than the unusable purified water quantity $Q_{ti}$, the operation proceeds to step S111. When the integrated flow quantity $Q_{mf}$, integrated from when the supply of the purified water is started, is not less than the unusable purified water quantity $Q_{ti}$, unlike the first embodiment, the operation proceeds to step S201.

At step S111, as in the first embodiment, the control and calculation part 131 transmits to the notification part 141 a notification signal notifying that the unusable purified water is being supplied and the notification part 141 notifies a user that the unusable purified water is being supplied. Thereafter, the operation returns to step S108.

At step S201, the control and calculation part 131 transmits to the notification part 141 a notification signal notifying that usable purified water suitable for use is being supplied and the notification part 141 notifies a user that the usable purified water is being supplied. Thereafter, the operation returns to step S108.

At step S202, the control and calculation part 131 determines whether an integrated flow quantity $Q_{mf}$ at the Nth time is greater than or equal to an unusable purified water quantity $Q_{ti}$ at the Nth time. When the integrated flow quantity $Q_{mf}$ at the Nth time is greater than or equal to the unusable purified water quantity $Q_{ti}$ at the Nth time, the operation proceeds to step S113, and as in the first embodiment, the control and calculation part 131 transmits to the notification part 141 a notification signal notifying that the notification that the usable purified water is being supplied is stopped and the notification part 141 stops the notification. Thereafter, the operation proceeds to step S114. When the integrated flow quantity $Q_{mf}$ at the Nth time is not greater than or equal to the unusable purified water quantity $Q_{ti}$ at the Nth time, the operation proceeds to step S203.

At step S203, the control and calculation part 131 controls the notification part 141 to notify that the supply of the unusable purified water is incomplete, that is, that water discarding is not sufficiently performed. The notification part 141 receives a notification signal from the control and calculation part 131 and notifies the user for a given period of time that the water discarding is not sufficiently performed. Thereafter, the operation proceeds to step S113.

As described above, in the water purifier 1 according to the second embodiment, the notification part 141 is configured so as to notify that the purified water supplied at the determination time point is suitable for use in the case where the quantity of the purified water, measured by the integrated flow quantity measuring part 113, for the period of time from when the supply of the purified water at the Nth time is started by the purified water supply part 110 up to the determination time point is greater than or equal to the unusable purified water quantity $Q_{ti}$ at the Nth time.

Hence, it is made possible that the user uses the purified water at ease.

In addition, in the water purifier 1 according to the second embodiment, the notification part 141 is configured so as to notify that the quantity of the purified water supplied for the period of time from when the supply of the purified water at the Nth time is started by the purified water supply part 110 up to the determination time point is less than the unusable purified water quantity $Q_{ti}$ in the case where the supply of the purified water by the purified water supply part 110 is stopped in when the quantity of the purified water, measured by the integrated flow quantity measuring part 113, for the period of time from when the supply of the purified water at the Nth time is started by the purified water supply part 110 up to the determination time point is less than the unusable purified water quantity $Q_{ti}$ at the Nth time.

Hence, it is made possible that by notifying that the water discarding is not sufficiently performed for the period of time from when the supply of the purified water at the Nth time is started up to when the supply of the purified water at the Nth time is stopped, the user is encouraged to call attention and to recognize that the water discarding is required.

The other configuration and effects of the water purifier according to the second embodiment are the same as those of the water purifier according to the first embodiment.

Third Embodiment

A water purifier according to a third embodiment is configured so as to be similar to the water purifier 1 (FIG. 1) according to the first embodiment. In the third embodiment, a notification part 141 of the water purifier 1 is configured so as to perform not only the notification in the case where purified water supplied by a purified water supply part 110 is unusable purified water but also notification of a remaining quantity of an unusable purified water quantity $Q_{ti}$ at the Nth time. Furthermore, the notification part 141 is configured so as to notify a period of time required to discard the remaining quantity of water of the unusable purified water quantity $Q_{ti}$ at the Nth time, that is, an unusable purified water supply remaining time $T_{ri}$ at the Nth time.

Figure 6:
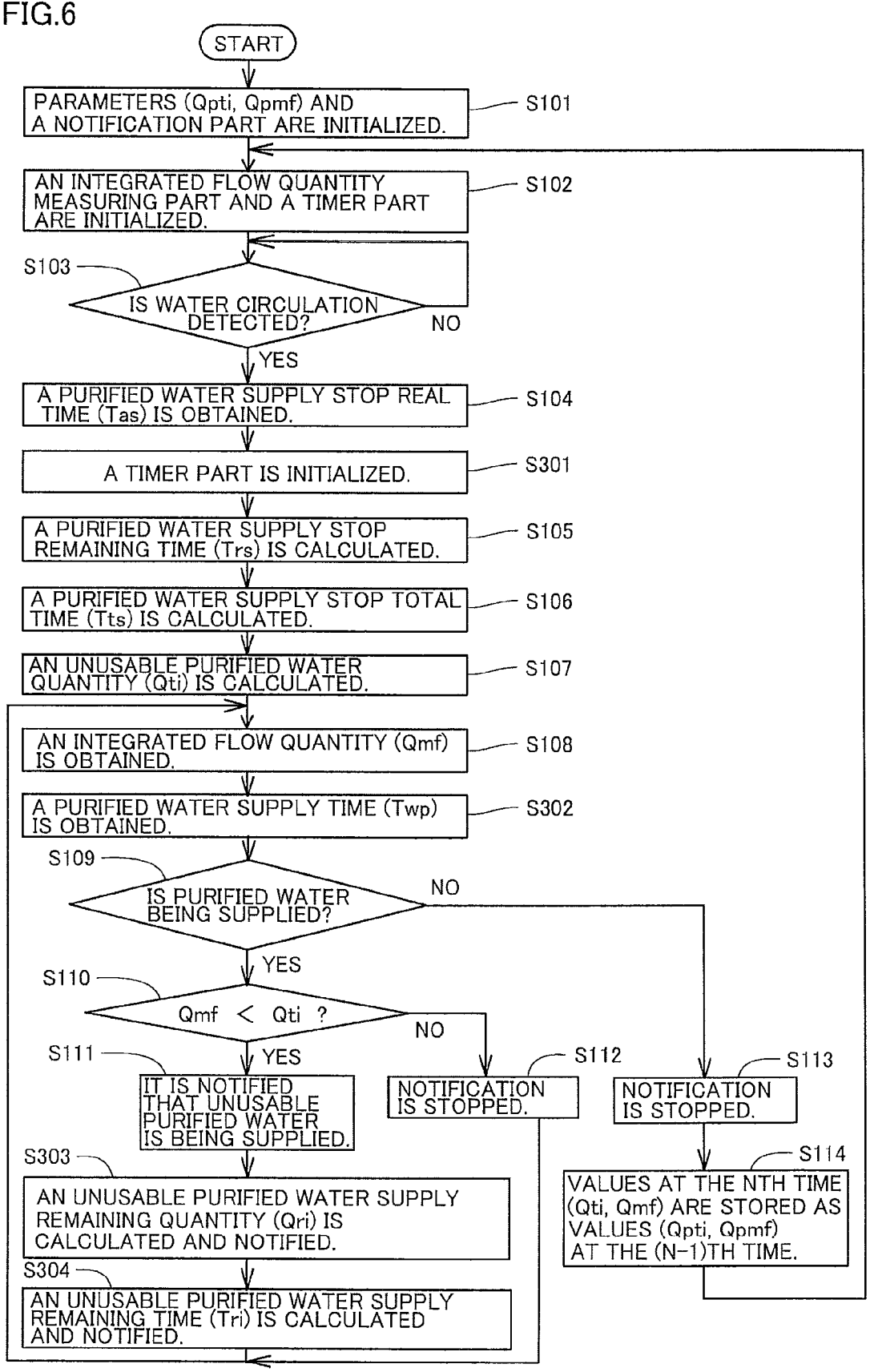
FIG. 6 is a flowchart showing control processes of a water discarding notification operation of a water purifier according to a third embodiment of the present invention in order.

As shown in FIG. 6, in the water purifier 1 according to the third embodiment, as in the first embodiment, at step S104, a control and calculation part 131 performs transmission and reception of a control signal to and from a timer part 121 and obtains from the timer part 121 a period of time measured by the timer part 121 at that time point, that is, a purified water supply stop real time $T_{as}$. The purified water supply stop real time $T_{as}$ is a period of time during which the supply of the purified water is being stopped. Thereafter, unlike the first embodiment, the operation proceeds to step S301.

At step S301, the control and calculation part 131 transmits the control signal to the timer part 121 and initializes the timer part 121. The timer part 121 resets the measured period of time to 0 and start a period of time from 0. Next, the operation proceeds to step S105.

Operations from step S105 to step S108 are the same as those in the first embodiment.

At step S108, as in the first embodiment, an integrated flow quantity at the present time, that is, an integrated flow quantity $Q_{mf}$ from when the supply of the purified water at the Nth time is started up to the present time is obtained from an integrated flow quantity measuring part 113. Thereafter, unlike the first embodiment, the operation proceeds to step S302.

At step S302, the control and calculation part 131 performs transmission and reception of a signal to and from the timer part 121 and obtains from the timer part 121 a purified water supply time $T_{wp}$ as a period of time measured by the timer part 121 for a period of time from step S301 to step S302. Thereafter, the operation proceeds to step S109.

Operations from step S109 to step S111 are the same as in the first embodiment. At step S111, the control and calculation part 131 transmits to the notification part 141 a notification signal notifying that unusable purified water is being supplied, and the notification part 141 notifies a user that the unusable purified water is being supplied. Thereafter, unlike first embodiment, the operation proceeds to step S303.

At step S303, first, the control and calculation part 131 calculates an unusable purified water supply remaining quantity $Q_{ri}$ at the Nth time. The unusable purified water supply remaining quantity $Q_{ri}$ at the Nth time is calculated by using the following (Equation 8).

$$Q_{ri} = Q_{ti} - Q_{mf} \quad \text{(Equation 8)}$$

The control and calculation part 131 transmits to the notification part 141 a notification signal indicating a value of the unusable purified water supply remaining quantity $Q_{ri}$ at the Nth time. The notification part 141 which has received the notification signal from the control and calculation part 131 notifies the user of the unusable purified water supply remaining quantity $Q_{ri}$ at the Nth time. The notification part 141 performs the notification by using notification means such as a loudspeaker or a display. The notification part 141 may be configured so as to perform the notification by using other notification means. Thereafter, the operation proceeds to step S304.

At step S304, the control and calculation part 131 calculates an unusable purified water supply remaining time $T_{ri}$ at the Nth time by using the following (Equation 9).

$$T_{ri} = (Q_{ri} T_{wp})/Q_{mf} \quad \text{(Equation 9)}$$

As described below, (Equation 9) is derived.

A ratio between the integrated flow quantity $Q_{mf}$ from when the supply of the purified water at the Nth time is started and the unusable purified water supply remaining quantity $Q_{ri}$ ($=Q_{ti}-Q_{mf}$) at the Nth time is equal to a ratio between the purified water supply time $T_{wp}$ and the unusable purified water supply remaining time $T_{ri}$ at the Nth time. In other words, the following (Equation 10) holds.

$$Q_{mf} : Q_{ri} = T_{wp} : T_{ri} \quad \text{(Equation 10)}$$

At step S304, because only the unusable purified water supply remaining time $T_{ri}$ at the Nth time is an unknown, the unusable purified water supply remaining time $T_{ri}$ at the Nth time can be calculated from (Equation 9) obtained by modifying (Equation 10).

However, immediately after starting the supply of the purified water, values of the integrated flow quantity $Q_{mf}$ from when the supply of the purified water at the Nth time is started and the purified water supply time $T_{wp}$ are small, and errors easily become large. Therefore, after some period of time has passed since the supply of the purified water was started, the purified water supply time $T_{wp}$ may be notified.

Because an instantaneous flow quantity upon the supply of the purified water is not necessarily constant, the unusable purified water supply remaining time $T_{ri}$ at the Nth time is an inferred value. However, because when the unusable purified water supply remaining quantity $Q_{ri}$ at the Nth time approaches 0, the unusable purified water supply remaining time $T_{ri}$ at the Nth time also approaches 0, and when the unusable purified water supply remaining quantity $Q_{ri}$ at the Nth time becomes 0, the unusable purified water supply remaining time $T_{ri}$ at the Nth time also becomes 0, the unusable purified water supply remaining time $T_{ri}$ at the Nth time obtained by using (Equation 9) serves as an indication of a remaining period of time required to sufficiently perform the water discarding.

In addition, in the third embodiment, although the water purifier 1 is configured so as to notify both of the unusable purified water supply remaining quantity $Q_{ri}$ at the Nth time and the unusable purified water supply remaining time $T_{ri}$ at the Nth time, the water purifier 1 may be configured so as to notify either one thereof.

As described above, in the water purifier 1 according to the third embodiment, the notification part 141 is configured so as to notify the difference between the quantity of the purified water supplied for the period of time from when the supply of the purified water at the Nth time is started by the purified water supply part 110 up to the determination time point and the unusable purified water quantity $Q_{ti}$ at the Nth time in the case where the quantity of the purified water, measured by the integrated flow quantity measuring part 113, for the period of time from when the supply of the purified water at the Nth time is started by the purified water supply part 110 up to the determination time point is less than or equal to the unusable purified water quantity $Q_{ti}$ at the Nth time.

Hence, it is made possible to allow a user to recognize the remaining quantity of water required to be discarded.

In addition, in the water purifier 1 according to the third embodiment, the notification part 141 is configured so as to notify the remaining period of time required when the purified water supply part 110 supplies the unusable purified water quantity $Q_{ti}$ of the purified water at the Nth time in the case where the quantity of the purified water, measured by the integrated flow quantity measuring part 113, for the period of time from when the supply of the purified water at the Nth time is started by the purified water supply part 110 up to the determination time point is less than or equal to the unusable purified water quantity $Q_{ti}$ at the Nth time, based on the difference between the unusable purified water quantity $Q_{ti}$ at the Nth time and the quantity of the purified water, measured by the integrated flow quantity measuring part 113, for the period of time from when the supply of the purified water at the Nth time is started up to the determination time point; the period of time during which the purified water is being supplied by the purified water supply part 110 for the period of time from when the supply of the purified water at the Nth time is started up to the determination time point; and the quantity of the purified water, measured by the integrated flow quantity measuring part 113, for the period of time from when the supply of the purified water at the Nth time is started up to the determination time point.

Hence, it is made possible to allow a user to recognize the remaining period of time required for the water discarding, that is, a period of time up to when usable purified water is supplied.

The other configuration and effects of the water purifier according to the third embodiment are the same as those of the water purifier according to the first embodiment.

Fourth Embodiment

Figure 7:
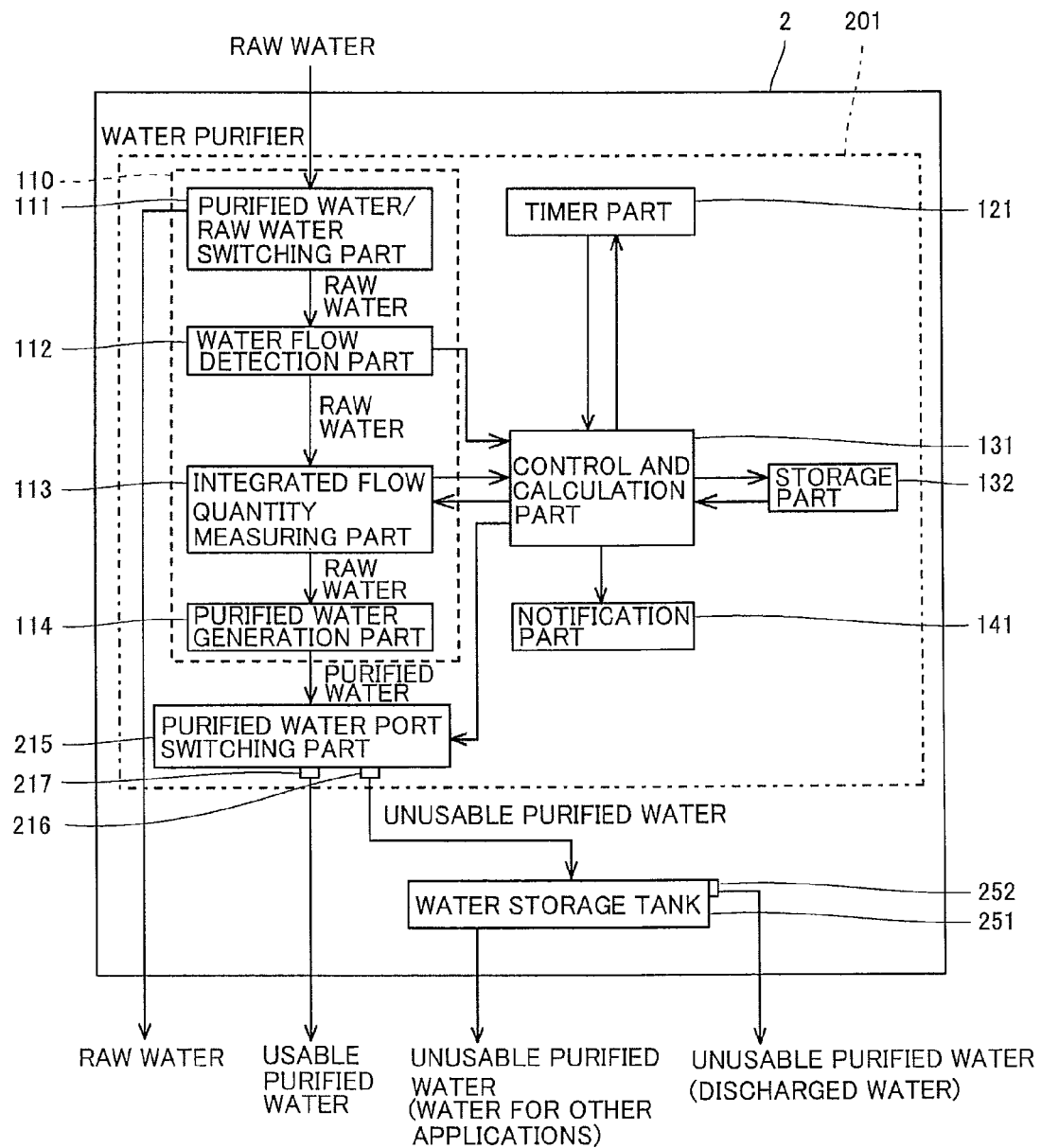
FIG. 7 is a diagram schematically illustrating a configuration of a water purifier according to a fourth embodiment of the present invention.

As shown in FIG. 7, a water purifier 2 according to a fourth embodiment is constituted of a water purifier main body 201; and a water storage tank 251 as a water storage container. The water purifier main body 201 includes a purified water port switching part 215 in addition to the configuration of the water purifier 1 (FIG. 1) according to the first embodiment. The purified water port switching part 215 is to receive a signal from a control and calculation part 131 and to switch whether purified water supplied from a purified water supply part 110 is supplied from a first purified water port 216 or a second purified water port 217. On an upper part of the water storage tank 251, a drainage port 252 is formed. When water in the water storage tank 251 is stored so as to reach a position of the drainage port 252, the water passes through the drainage port 252 and is discharged outside the water purifier 2. The water storage tank 251 and the water purifier main body 201 are connected so as to cause the purified water supplied from the first purified water port 216 of the water purifier main body 201 to flow into the water storage tank 251. In the water storage tank 251, a tap (not shown) is attached, and a user opens the tap and can tap off the water from an inside of the water storage tank 251. The other configuration of the water purifier 2 according to the fourth embodiment is the same as that of the water purifier 1 (FIG. 1) according to the first embodiment.

Figure 8:
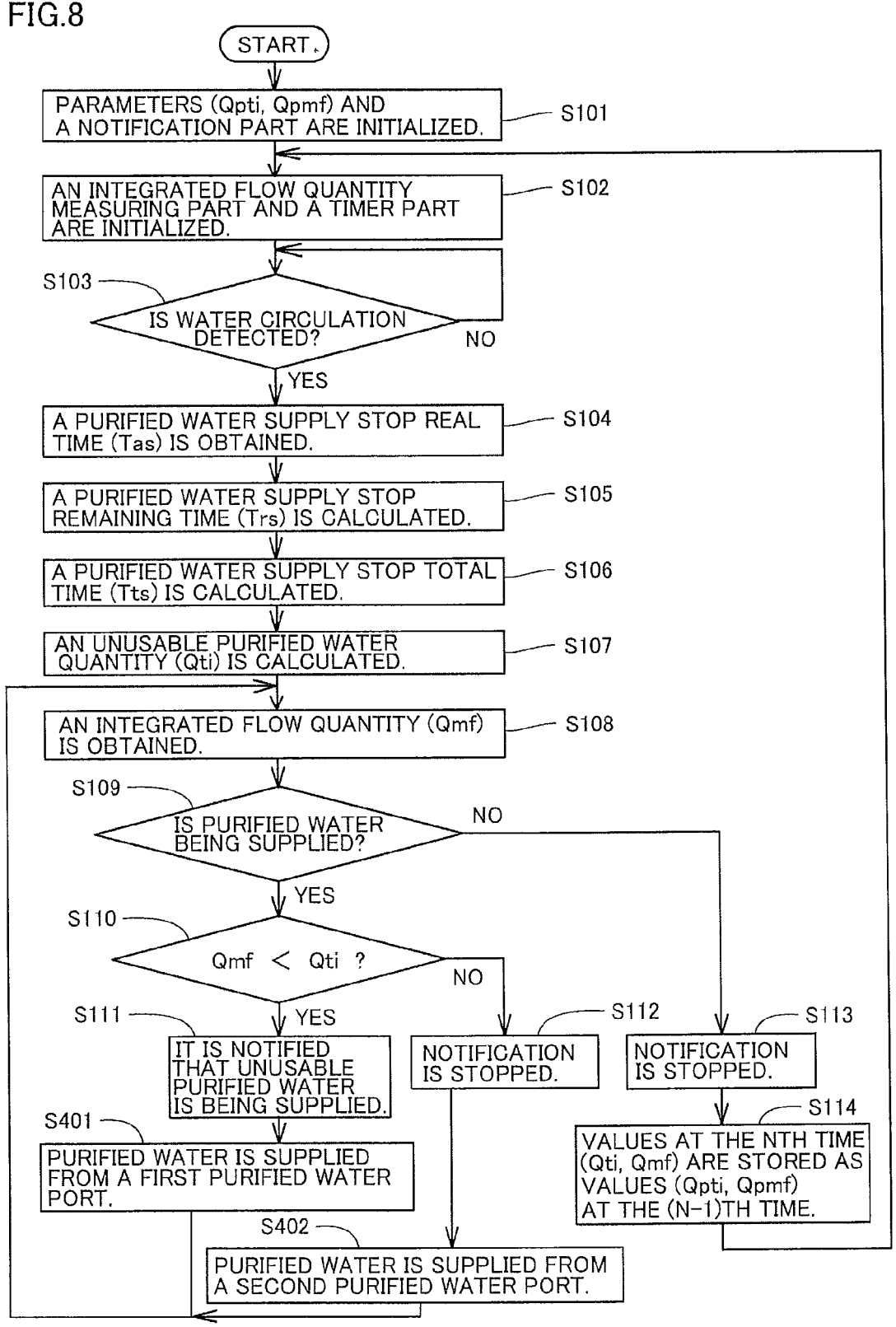
FIG. 8 is a flowchart showing control processes of a water discarding notification operation of a water purifier according to a fourth embodiment of the present invention in order.

As shown in FIG. 8, in the water purifier 2, as in the first embodiment, at step S111, a control and calculation part 131 transmits to a notification part 141 a notification signal notifying that unusable purified water is being supplied, and the notification part 141 notifies the user that the unusable purified water is being supplied. Thereafter, unlike the first embodiment, the operation proceeds to step S401.

At step S401, the control and calculation part 131 transmits a control signal to the purified water port switching part 215 and controls the purified water port switching part 215 to supply the purified water from the first purified water port 216. Thereafter, the operation returns to step S108. However, in a case where the purified water port switching part 215 has already performed the switching so as to supply the purified water from the first purified water port 216, the switching of the purified water port is not performed by the purified water port switching part 215.

The purified water supplied from the first purified water port 216 is stored in the water storage tank 251. The water in the water storage tank 251 is stored such that a level thereof reaches a height of the drainage port 252. When the water is further supplied into the water storage tank 251, the water in the water storage tank 251 is discharged from the drainage port 252. The user opens the tap of the water storage tank 251 and can tap off the unusable purified water stored in the water storage tank 251 from the inside of the water storage tank 251. A user may use the water tapped off from the water storage tank 251 for use other than drinking.

In addition, in the water purifier 2, as in the first embodiment, at step S112, the control and calculation part 131 transmits to the notification part 141 a notification signal which stops the notification notifying that the unusable purified water is being supplied, and the notification part 141 stops the notification. Thereafter, unlike the first embodiment, the operation proceeds to step S402.

At step S402, the control and calculation part 131 transmits a control signal to the purified water port switching part 215 and controls the purified water port switching part 215 to supply the purified water from the second purified water port 217. Thereafter, the operation returns to step S108. The user can use the purified water supplied from the second purified water port 217 as it is for drinking and the like.

As described above, in the water purifier 2 according to the fourth embodiment, the purified water supply part 110 includes: the first purified water port 216 and the second purified water port 217. The water purifier 2 is configured such that the purified water supply part 110 supplies the purified water from the first purified water port 216 in a case where a quantity of the purified water, measured by an integrated flow quantity measuring part 113, for a period of time from when the supply of the purified water at the Nth time is started by the purified water supply part 110 up to a determination time point is less than an unusable purified water quantity $Q_n$ at the Nth time; and the purified water supply part 110 supplies the purified water from the second purified water port 217 in a case where a quantity of the purified water, measured by the integrated flow quantity measuring part 113, for the period of time from when the supply of the purified water at the Nth time is started by the purified water supply part 110 up to the determination time point is greater than or equal to the unusable purified water quantity at the Nth time.

Hence, since the purified water supplied from the first purified water port 216 is the purified water unsuitable for use such as drinking and the purified water supplied from the second purified water port 217 is the purified water suitable for use such as drinking, danger that a user uses the discarded water as drinking water by mistake can be reduced.

In addition, the water purifier 2 according to the fourth embodiment includes the water storage tank 251 connected to the first purified water port 216 and on the upper part of the water storage tank 251, the drainage port 252 is formed.

Hence, the unusable purified water is stored in the water storage tank 251 and can be used for use applications other than the use application as the purified water, for example, watering for plants and car washing. Furthermore, on the upper part of the water storage tank 251, the drainage port 252 is formed, thereby allowing accidents such as overspill of water from the water storage tank 251 to be prevented.

The other configuration and effects of the water purifier 2 according to the fourth embodiment are the same as those of the water purifier 1 according to the first embodiment.

The described embodiments are to be considered in all respects only as illustrative and not restrictive. It is intended that the scope of the invention is, therefore, indicated by the appended claims rather than the foregoing description of the embodiment and examples and that all modifications and variations coming within the meaning and equivalency range of the appended claims are embraced within their scope.

INDUSTRIAL APPLICABILITY

The present invention can provide a water purifier capable of determining an appropriate discarded water quantity, and thus, is useful in relation to a water purifier which causes raw water to be purified water by using a filtering medium.

REFERENCE SIGNS LIST

1, 2: water purifier, 110: purified water supply part, 111: purified water/raw water switching part, 112: water flow detection part, 113: integrated flow quantity measuring part, 114: purified water generation part, 121: timer part, 131: control and calculation part, 132: storage part, 141: notification part; 216: first purified water port, 217: second purified water port, 251: water storage tank, 252: drainage port.

The invention claimed is:

1. A water purifier comprising:
    a purified water supply part generating purified water and supplying the purified water to an outside of said water purifier
    a timer part;
    a purified water quantity measuring part measuring a quantity of the purified water supplied by the purified water supply part; and
    a control and calculation part,
    wherein
    the purified water supply part repeats starting and stopping supply of the purified water N times (where N is a natural number),
    the timer part measures a first period from when the supply of the purified water is stopped for an (N−1)th time up to when the supply of the purified water is started for an Nth time, when a quantity of the purified water, measured by the purified water quantity measuring part, for a period of time from when the supply of the purified water for the (N−1)th time is started up to when the supply of the purified water for the (N−1)th time is stopped is smaller than a first quantity which is an amount of water to be discarded during the supply of the purified water for the (N−1)th time, the control and calculation part sets a second quantity which is an amount of water to be discarded during the supply of the purified water for the Nth time based on the first period and a difference between the first quantity and the quantity of the purified water, measured by the purified water quantity measuring part, for the period of time from when the supply of the purified water for the (N−1)th time is started up to when the supply of the purified water for the (N−1)th time is stopped.

2. The water purifier according to claim 1, further comprising a notification part notifying a user of information pertinent to the purified water supplied by the purified water supply part.

3. The water purifier according to claim 2, wherein the notification part notifies that the purified water is unsuitable for use in the case where the quantity of the purified water, measured by the purified water quantity measuring part, during the supply of the purified water for the Nth time the purified water at the Nth time is started by the purified water supply part up to the is less than the second quantity.

4. The water purifier according to claim 2, wherein the notification part notifies that the purified water is suitable for use in a case where the quantity of the purified water, measured by the purified water quantity measuring part, during the supply of the purified water for the Nth time is greater than or equal to the second quantity.

5. The water purifier according to claim 2, wherein the notification part notifies that the quantity of the purified water supplied for the period of time from when the supply of the purified water for the Nth time is started up to when the supply of the purified water for the Nth time is stopped is less than the second quantity in a case where the quantity of the purified water, measured by the purified water quantity measuring part after the supply of the purified water for the Nth time is stopped, for the period of time from when the supply of the purified water for the Nth time is started by the purified water supply part up to when the supply of the purified water for the Nth time is stopped is less than the second quantity.

6. The water purifier according to claim 2, wherein the notification part notifies a difference between the quantity of the purified water measured by the purified water quantity measuring part and the second quantity in a case where the quantity of the purified water, measured by the purified water quantity measuring part, during the supply of the purified water for the Nth time is less than or equal to the second quantity.

7. The water purifier according to claim 2, wherein
the timer part measures a second period from when the supply of the purified water for the Nth time is started up to when purified water quantity measuring part measures the quantity of the purified water, and
in a case where the quantity of the purified water measured by the purified water quantity measuring part during the supply of the purified water for the Nth time is less than the second quantity for the Nth time, the notification part notifies a remaining period of time required for the purified water supply part to supply the second quantity of the purified water based on: a difference between the second quantity and the quantity of the purified water, measured by the purified water quantity measuring part, during the supply of the purified water for the Nth time; the second period; and the quantity of the purified water, measured by the purified water quantity measuring part, during the supply of the purified water for the Nth time.

8. The water purifier according to claim 1, wherein the purified water supply part includes: a first purified water port and a second purified water port, the purified water supply part supplying the purified water from the first purified water port in the case where the quantity of the purified water, measured by the purified water quantity measuring part, during the supply of the purified water for the Nth time is less than the second quantity, the purified water supply part supplying the purified water from the second purified water port in a case where the quantity of the purified water, measured by the purified water quantity measuring part, during the supply of the purified water for the Nth time is greater than or equal to the second quantity.

9. The water purifier according to claim 8, further comprising
a water storage container being connected to the first purified water port, wherein
on an upper part of the water storage container, a drainage port is formed.

10. The water purifier according to claim 1, wherein when N equals 1, the first period equals 0 and the first quantity equals a predetermined value equal to or greater than 0.

* * * * *